Jan. 24, 1933.  L. D. SOUBIER  1,895,137
GLASS BLOWING MACHINE
Original Filed Aug. 27, 1923    12 Sheets-Sheet 10
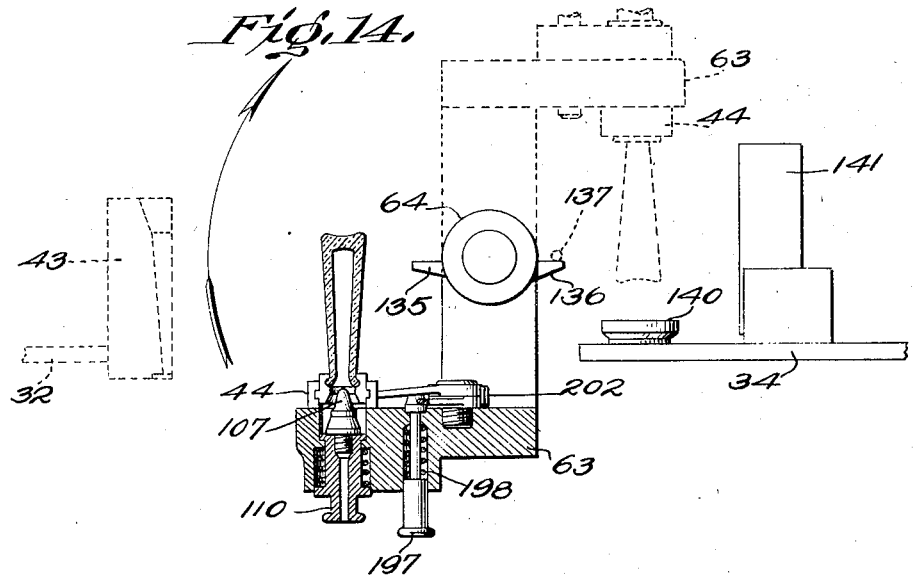
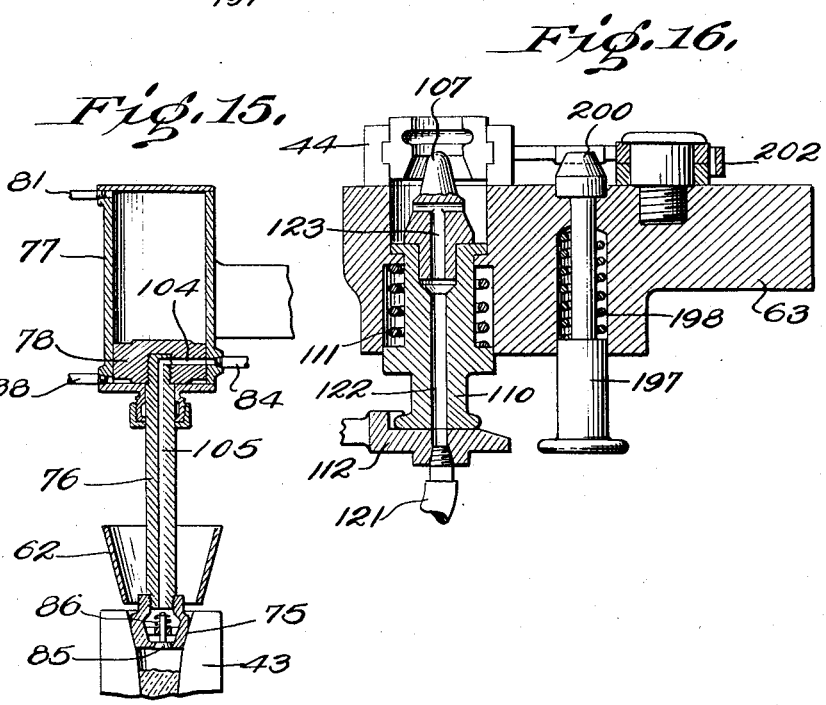
Inventor
*Leonard D. Soubier*
By *John F. Rule*
Attorney Jan. 24, 1933.     L. D. SOUBIER     1,895,137
GLASS BLOWING MACHINE
Original Filed Aug. 27, 1923    12 Sheets-Sheet 11
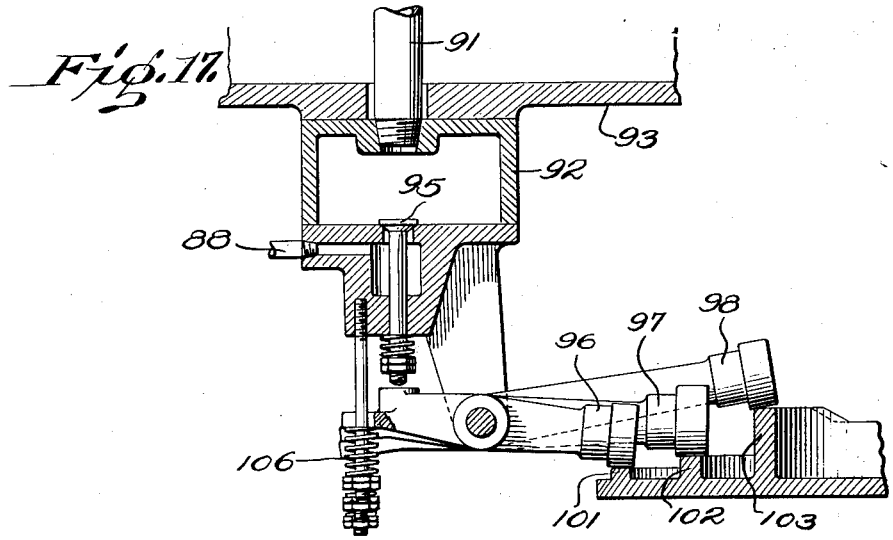
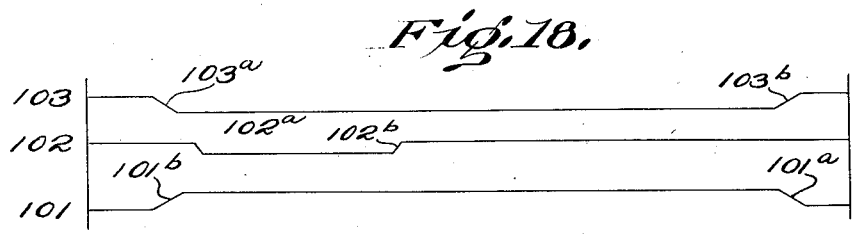
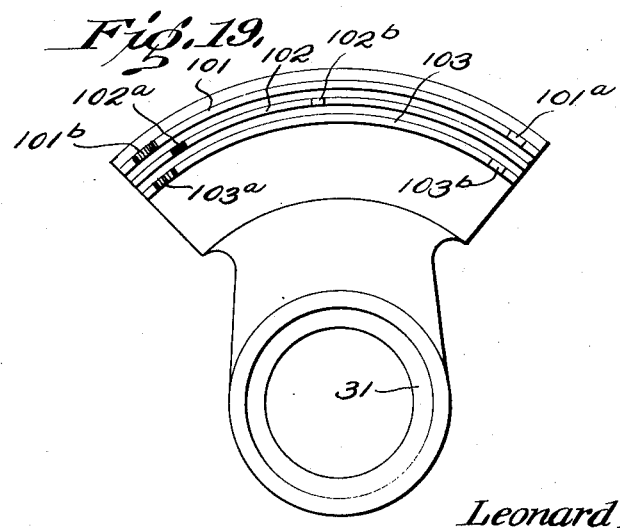
Inventor
*Leonard D. Soubier*
By *John F. Rule*
Attorney Jan. 24, 1933.  L. D. SOUBIER  1,895,137
GLASS BLOWING MACHINE
Original Filed Aug. 27, 1923  12 Sheets—Sheet 12
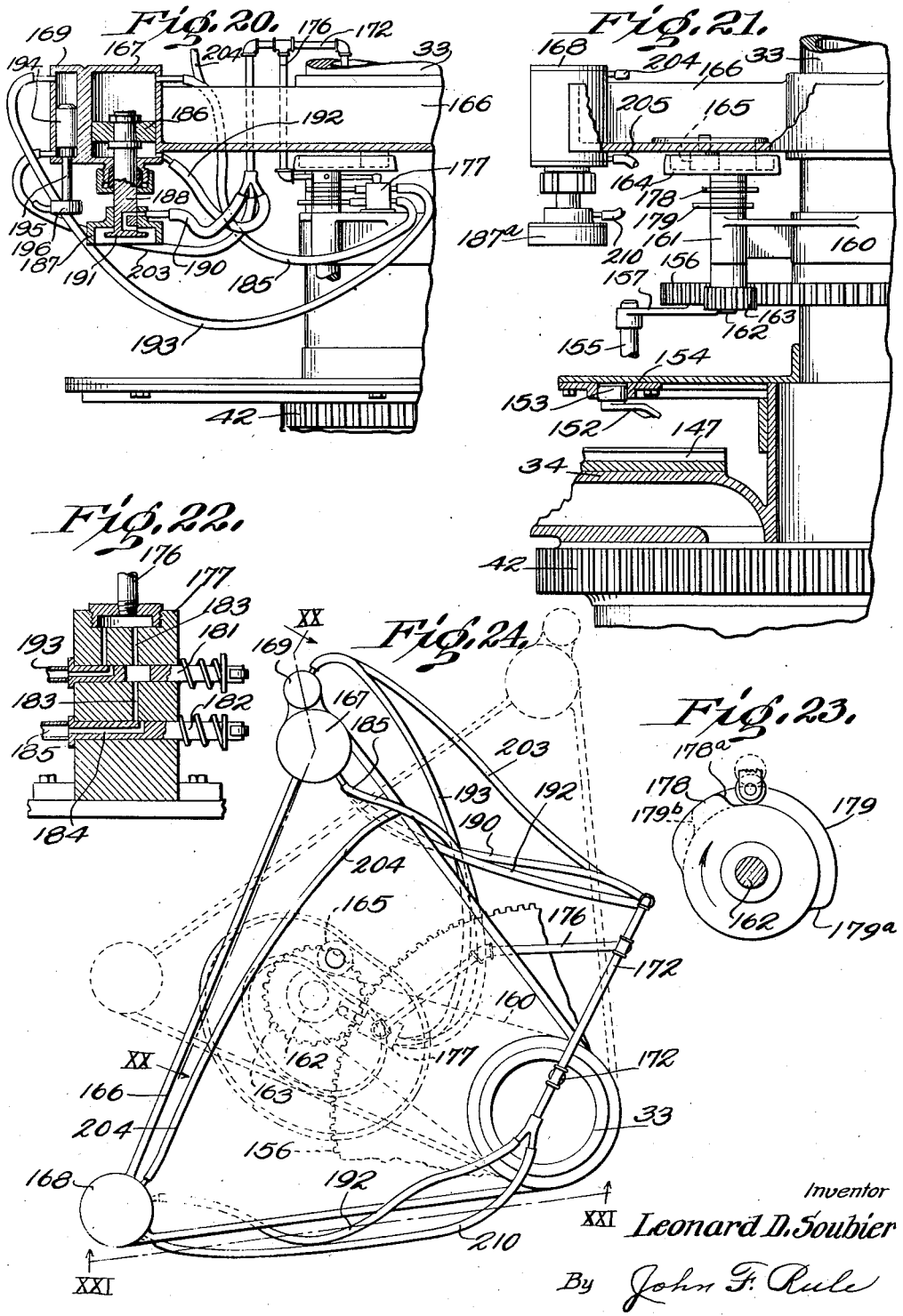
Inventor
Leonard D. Soubier
By John F. Rule
Attorney Patented Jan. 24, 1933

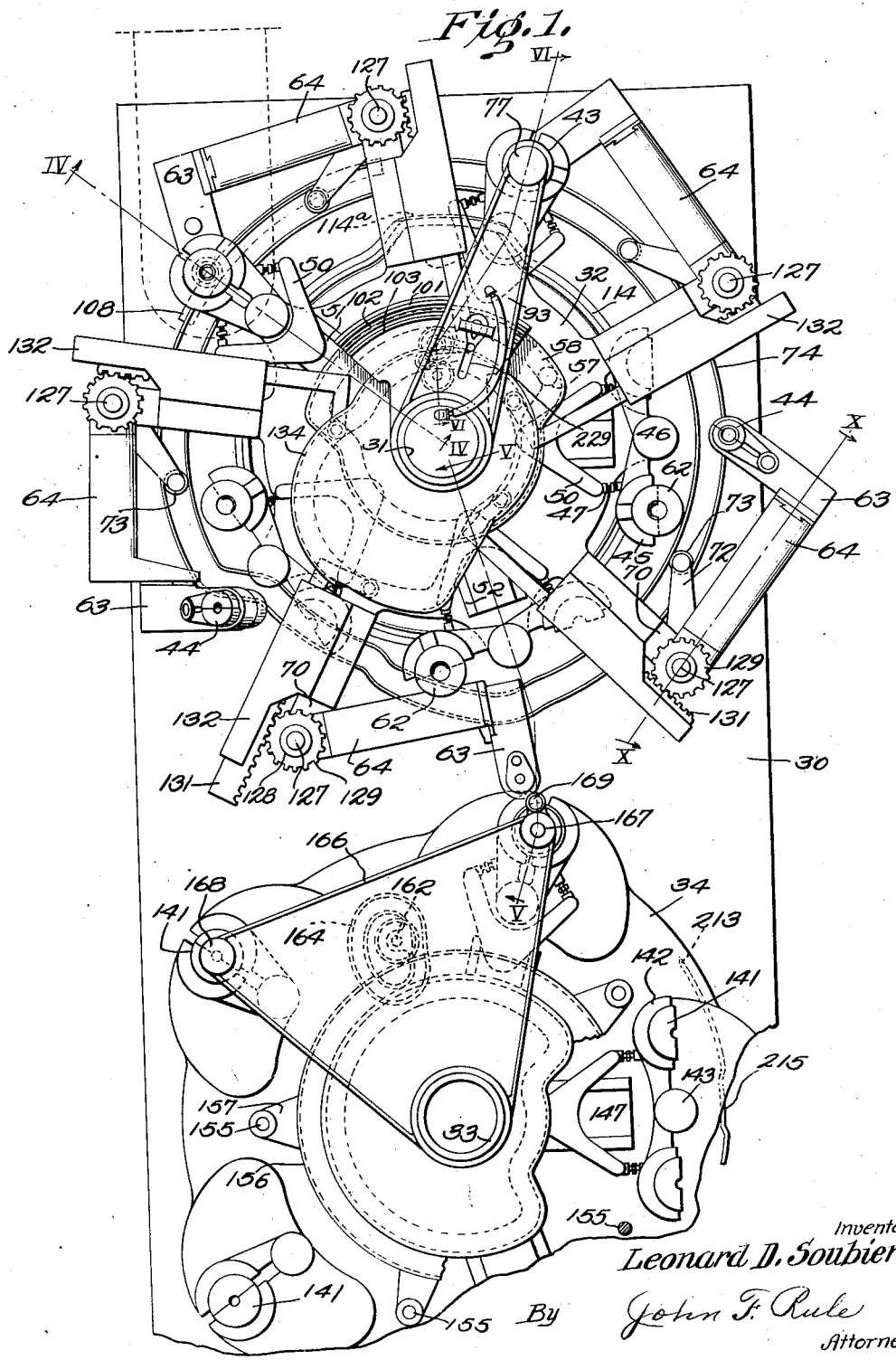

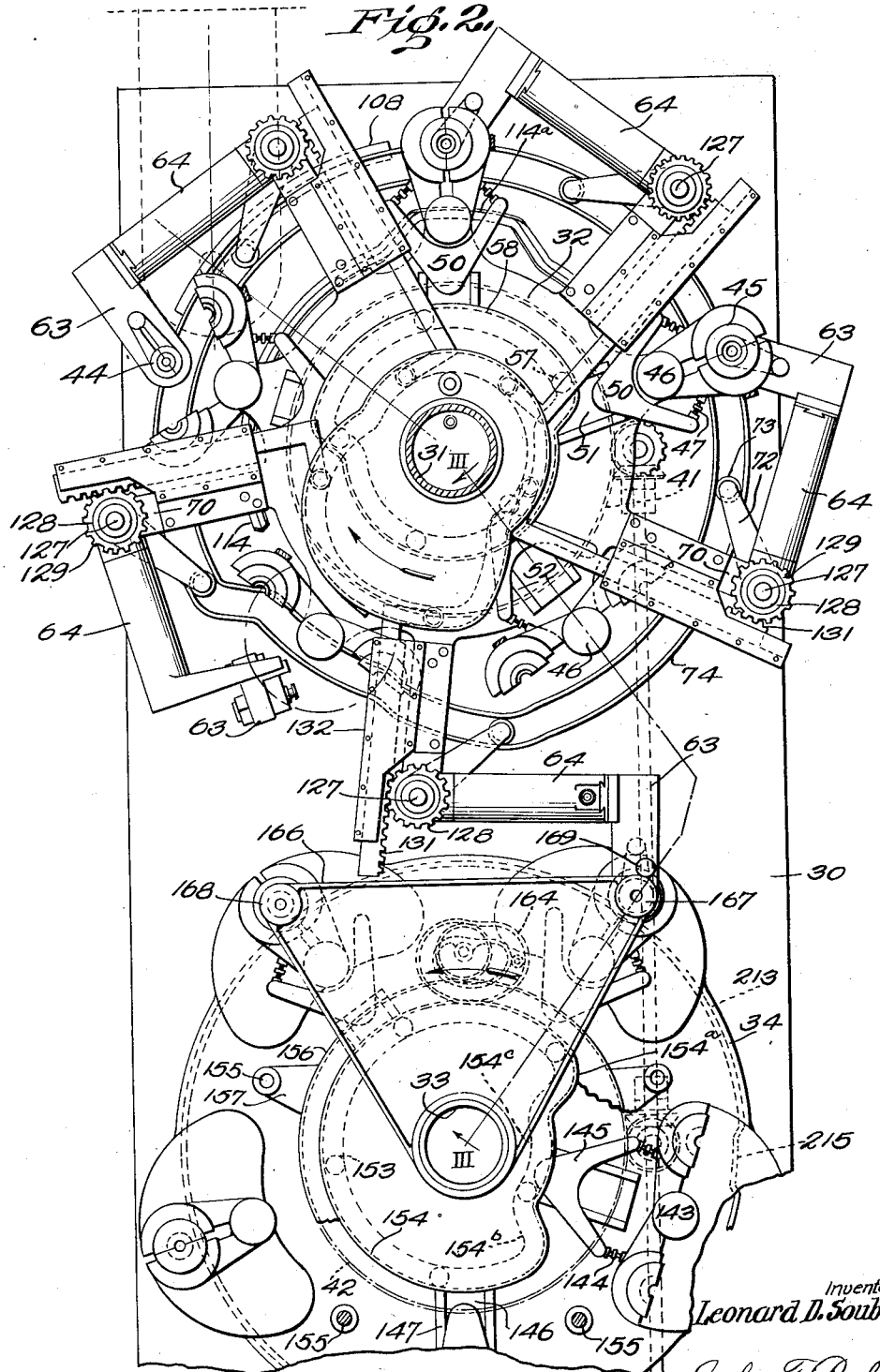

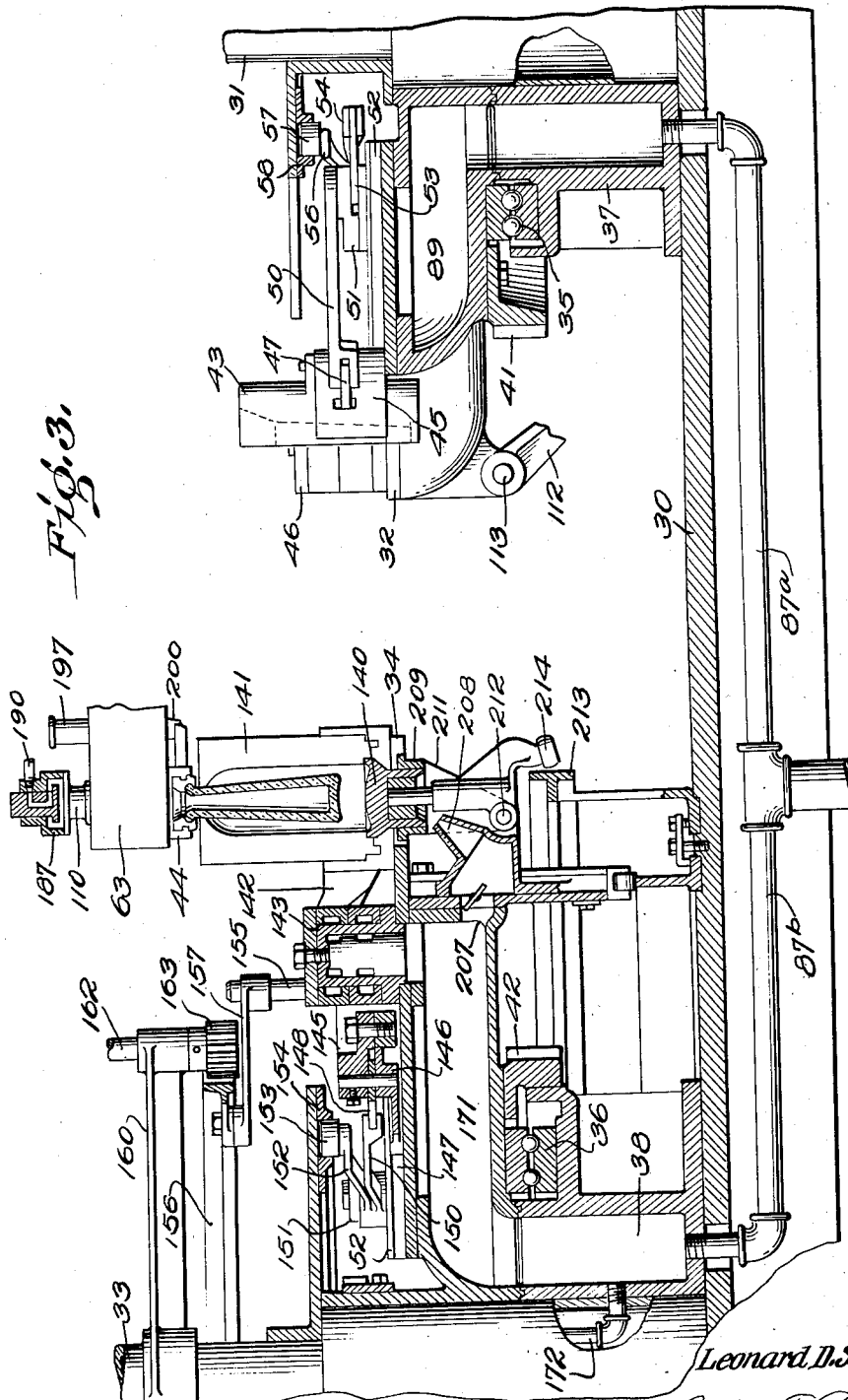

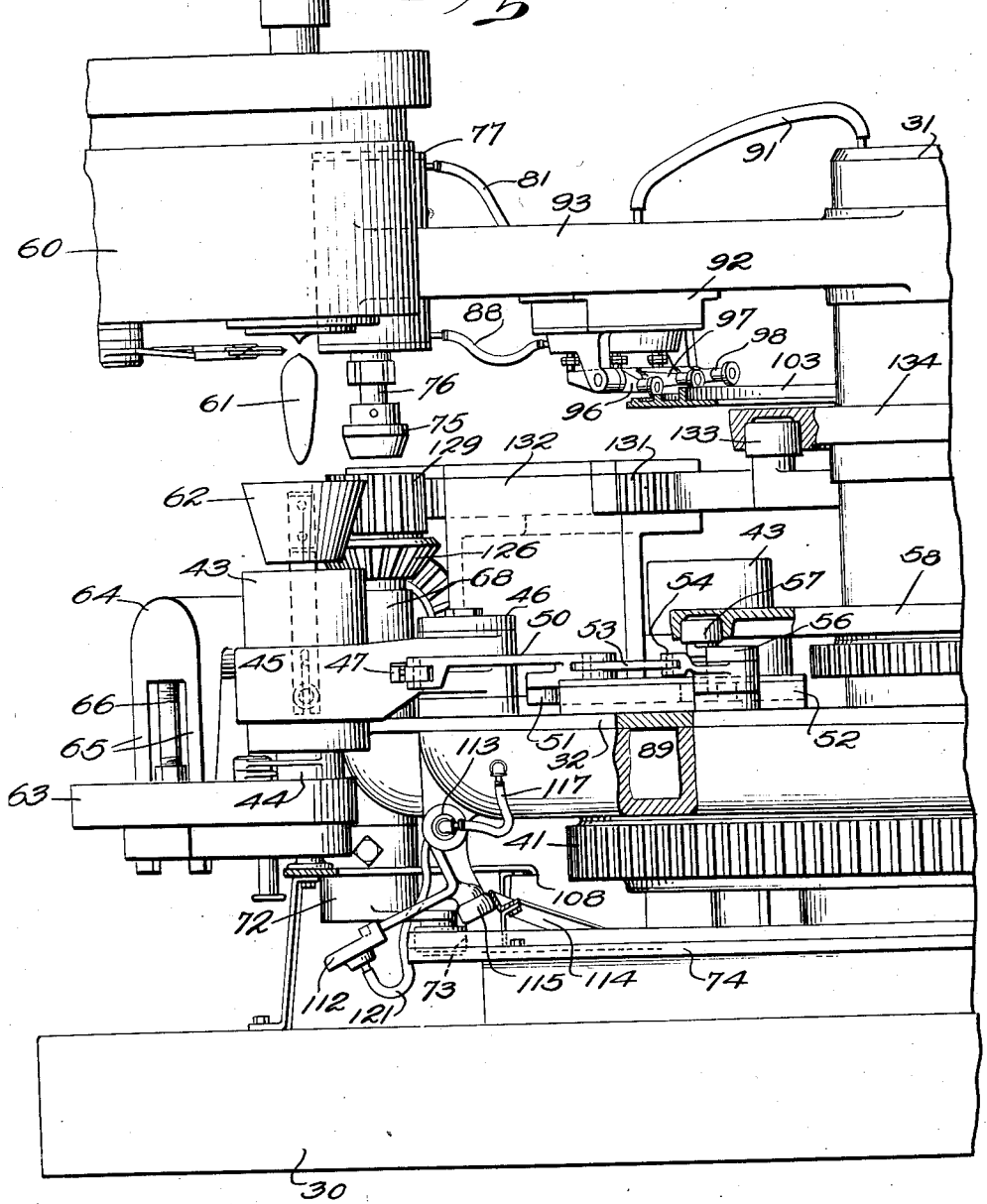

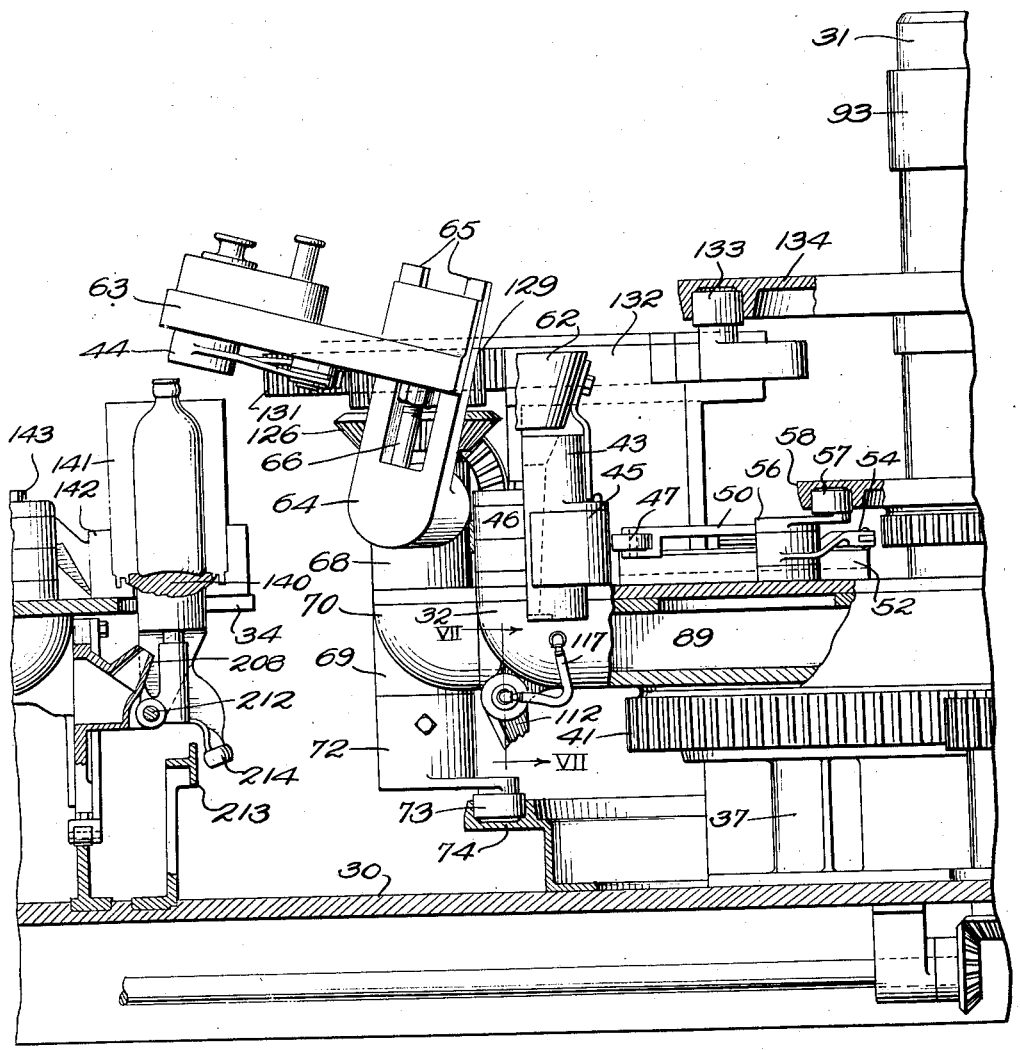

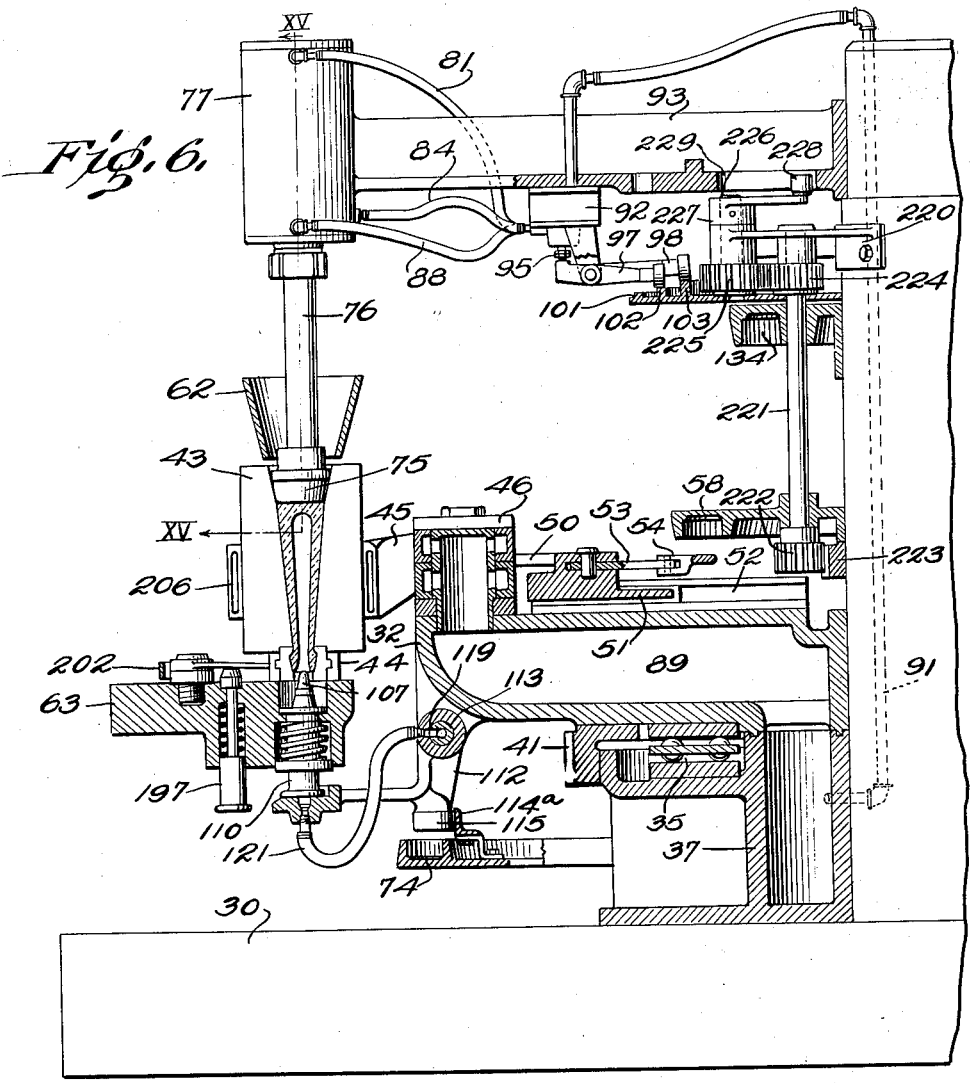

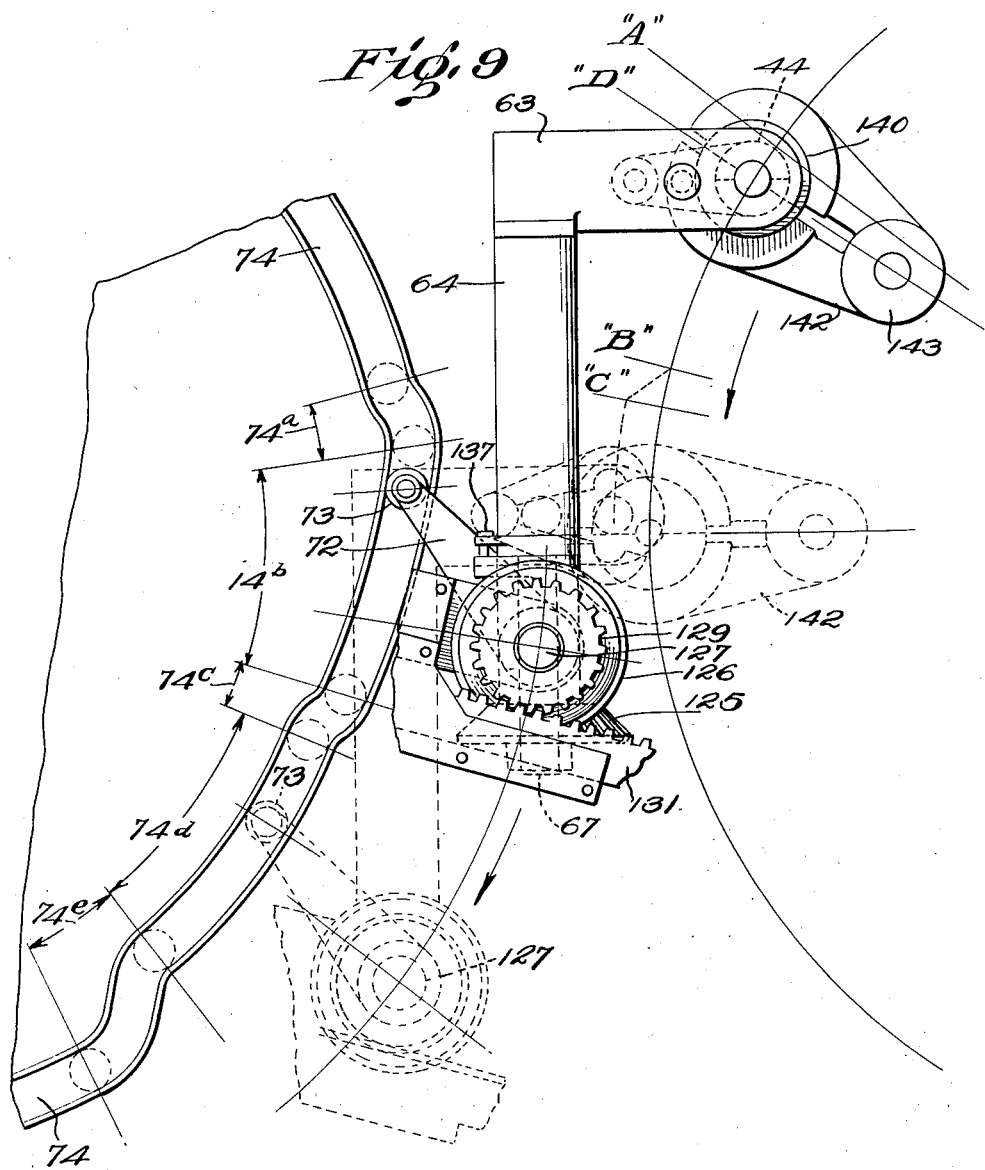

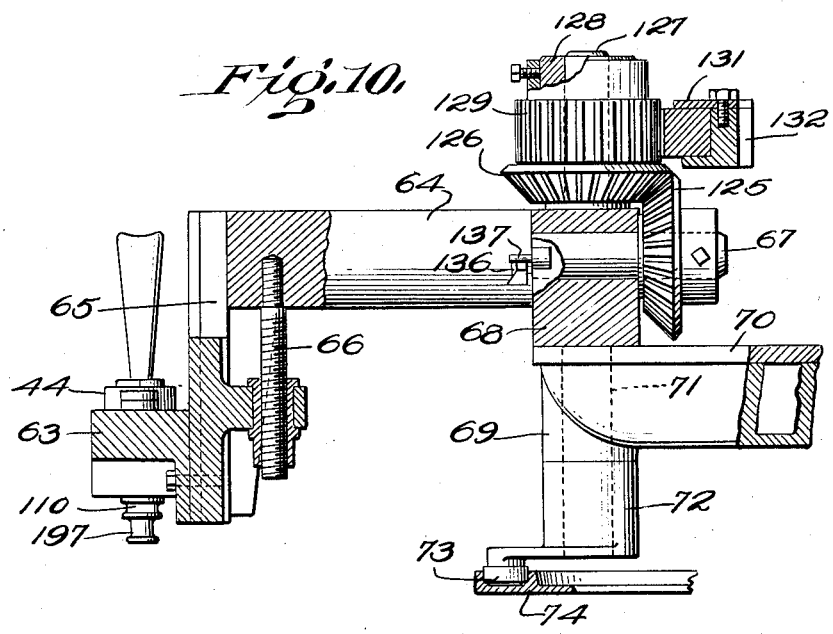
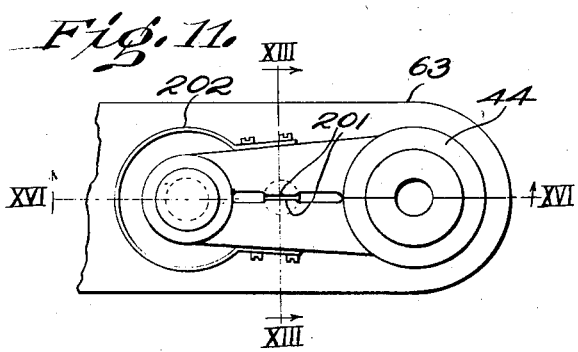
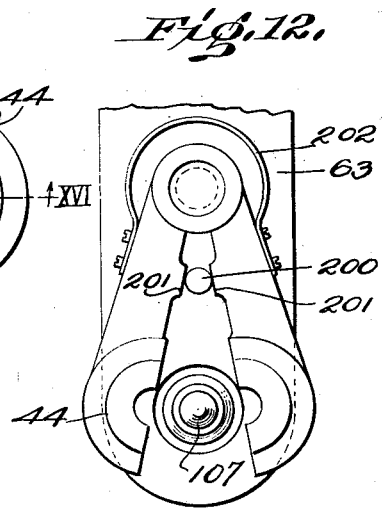
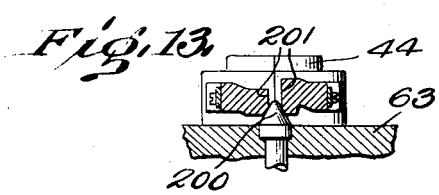

1,895,137

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS BLOWING MACHINE

Original application filed August 27, 1923, Serial No. 659,451, now Patent No. 1,705,341, dated March 12, 1929. Divided and this application filed February 12, 1929. Serial No. 339,464.

My invention relates to machines for forming bottles or other hollow glass articles, and is herein shown as embodied in a type of machine comprising two separate tables mounted for continuous rotation, these two tables designed to carry the blank or parison molds and the finishing molds respectively.

In the preferred form of my invention, the blank mold table and the finishing mold table are arranged side by side and spaced apart with their adjacent portions moving in the same direction, in order that a transfer of the parison from the blank mold to the finishing mold may be effected during the time that such molds are adjacent each other and moving in the same general direction.

An object of the present invention is to provide in a machine of the character indicated, a novel mechanism for blowing the parisons in the finishing molds. More particularly, the invention provides a blowing head which registers with each of the finishing molds in succession, thereby avoiding the necessity of providing individual blowing heads for the finishing molds, as is usual in machines of the type indicated. The invention further provides a plurality of such blowing heads, each operative to register with the finishing molds in succession.

The present application is a division of my copending application, Serial Number 659,451, filed August 27, 1923, on which Patent Number 1,705,341 was granted March 12, 1929.

In the accompanying drawings:

Fig. 1 is a plan view of a machine constructed in accordance with my invention.

Fig. 2 is a part sectional plan with the mold heads shown in different positions.

Fig. 3 is a sectional elevation taken at the line III—III on Fig. 2.

Fig. 4 is a part sectional elevation taken at the line IV—IV on Figure 1, at the charging station.

Fig. 5 is a part sectional elevation about at the line V—V on Fig. 1, showing the transfer head disengaged from the blown article.

Fig. 6 is a sectional elevation at line VI—VI on Fig. 1.

Fig. 7 is a section through the blank blow head at line VII—VII on Fig. 5.

Fig. 9 is a diagrammatic plan view showing various positions assumed by the transfer mechanism during the transfer operation.

Fig. 10 is a sectional elevation at the line X—X on Fig. 1, showing the transfer operating mechanism.

Fig. 11 is a plan view of the neck mold in closed position.

Fig. 12 is a view similar to Fig. 11, with the mold open.

Fig. 13 is a section at the line XIII—XIII on Fig. 11.

Fig. 14 is a section of the transfer head and also shows in broken lines the reversed position of said head.

Fig. 15 is a section through the blank blow head at line XV—XV on Fig. 6.

Fig. 16 is a sectional elevation taken at line XVI—XVI on Fig. 11.

Fig. 17 is a sectional elevation through the valve control box on the blank mold blow head arm.

Fig. 18 is a development of the cams for the above control box.

Fig. 19 is a plan view of the control cams.

Fig. 20 is a sectional elevation through the finishing mold blow head taken at the line XX—XX on Fig. 24.

Fig. 21 is a part sectional view showing the operating mechanism for said finishing mold blow head.

Fig. 22 is a section through the valve control box on said blow head.

Fig. 23 is a plan view of the cams for the finishing mold blow head valves.

Fig. 24 is a plan view of the finishing mold blow head arm.

Figure 8:
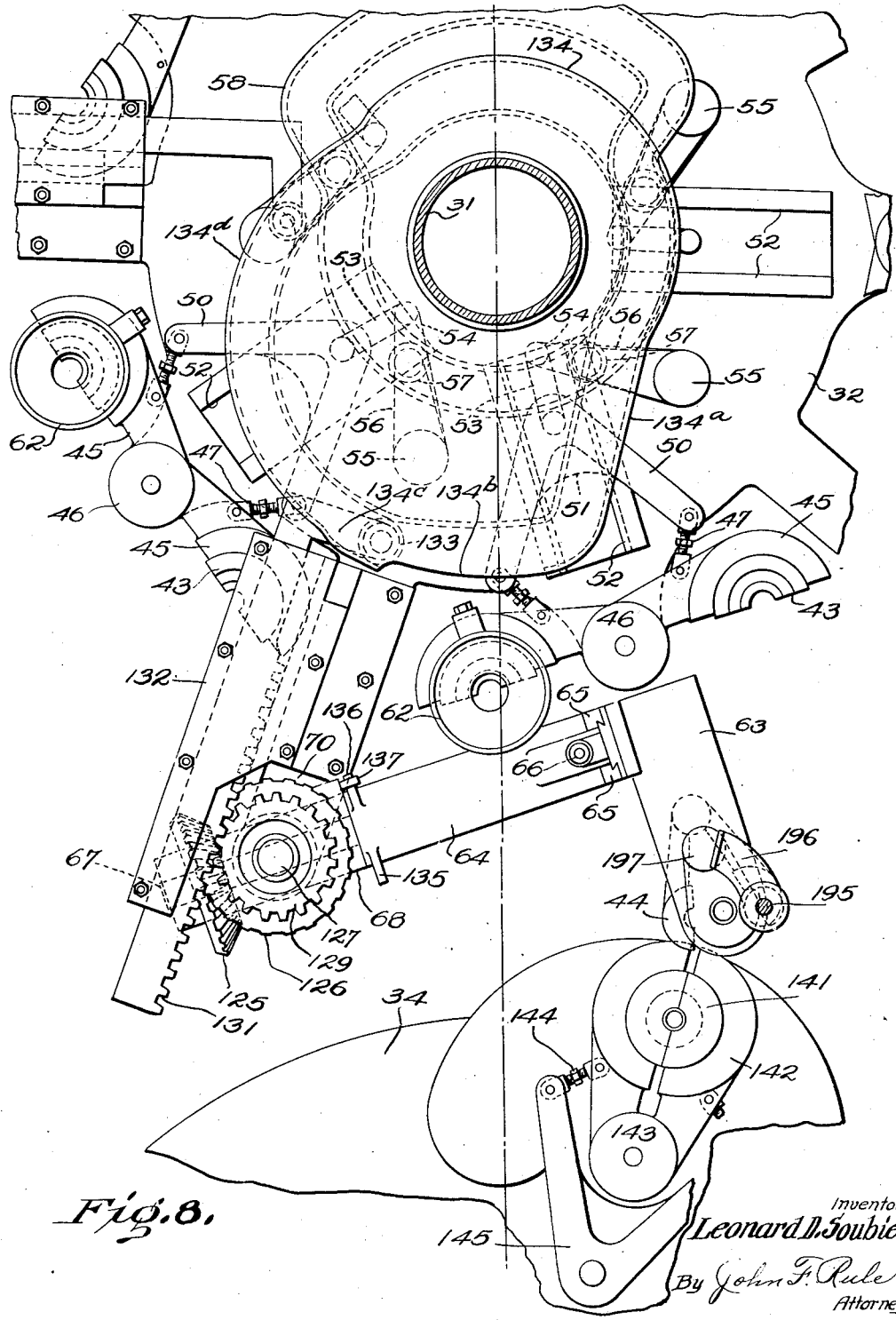
Fig. 8 is a plan view of the transfer mechanism.

Referring particularly to Figures 1 and 2 of the drawings, 30 designates a base or platform adjacent one end of which is erected a column 31 designed to support the blank mold carriage 32. A similar support or column 33 is erected on the base adjacent the other end thereof and supports the blow mold carriage 34. The mold tables 32 and 34 are mounted for rotation on roller bearings 35 and 36 (Fig. 3) on drum castings 37 and 38 respectively and are driven by a motor (not shown) having driving connections with annular gears 41 and 42 on the blank and finishing mold carriages respectively. These mold carriages are each adapted to carry a plurality of mold units hereinafter more fully described and which may be of any number desired. In the present instance, five of these units have been shown mounted on each table and as all the units on a table are alike, a description of one will be deemed sufficient for all.

Each blank mold unit comprises a sectional body or blank mold 43 and a sectional neck mold 44. The blank mold is made in horizontally separable sections mounted on arms 45 (see Fig. 8), said arms pivoted to swing about a bearing sleeve 46. Links 47 connect the mold arms with a yoke 50 on a slide 51 (Fig. 4) which reciprocates radially in guides 52 on the mold carriage 32, said guides extending radially of the machine. The yoke 50 is connected through a link 53 to a rock arm 54 on a rock shaft 55, to which is also connected a rock arm 56 having a cam roll 57 running in a stationary cam 58. This cam is so shaped as to effect the opening and closing of the blank molds at predetermined periods, as hereinafter noted.

As the mold carriage rotates, each mold unit is brought beneath a charging feeder 60 (Fig. 4) from which charges of glass 61 are supplied. At this time, the blank mold 43 is closed and in inverted position with the funnel guide 62 directly above and in alignment therewith, and the neck mold 44 is beneath and locked in register with the blank mold to form the neck end of the bottle.

Each neck mold is mounted on an adjustable head 63, said head forming a part of an inverting arm 64. Projections 65 of this arm (see Figs. 5, 8 and 10) are formed as slideways, in which the head 63 may be vertically adjusted by means of an adjusting screw 66. This adjustment is provided to allow for different height molds. The neck mold 44 or other blank holder is offset vertically and horizontally relative to the horizontal axis about which the blank swings. The arm 64 has a shaft projection 67 (Figs. 9 and 10) mounted in a bearing block 68. A shaft 71 extends from the bearing block through a bearing 69 formed in an extension 70 of the carriage 32 and has attached thereto an arm 72 carrying a cam roll 73, said roll running in a stationary cam 74. This cam controls the horizontal oscillation of the arm 64, thereby aligning the neck mold with either the blank mold or finishing mold.

Referring to Figs. 1, 2, 5 and 9, it will be seen that the cam 74 is so shaped that it will hold the neck mold 44 in vertical alignment or approximately in alignment with the finishing mold during a predetermined period of its travel, in order that the blank may be blown to the shape of the finishing mold before the release of the neck mold is effected. After the neck mold carrying the bare blank has been completely inverted, a section 74$^a$ (Fig. 9) of the cam 74 is so shaped as to bring the neck mold 44 into alignment with the arc in which the finishing mold travels at the point where radius line "A" crosses said arc. Section 74$^b$ is shaped to guide the neck mold along the arc from radius line "A" to radius line "B" and thereafter section 74$^c$ swings it outward from said arc to point "C". Its position is then controlled for a predetermined period by section 74$^d$ of the cam. Section 74$^e$ is shaped to swing the neck mold back into normal position.

Immediately after a charge of glass is received in the blank mold 43, a combination blow head and closing plate 75 (see Fig. 15) is moved into position over the open upper end of the mold. This head, attached to the piston rod 76 of an air motor 77, is then lowered to close the mold by admitting air above the piston 78 of said motor through a pipe 81. Air under pressure is then admitted through the head 75 to compact the glass and cause it to take the shape of the neck mold. This air is supplied through a pipe 84 and a check valve 85 in the plate, said valve normally held closed by a spring 86. The mechanism for supplying compressed air to the blowing head plate 75 and air motor 77, and for blowing the parison to hollow form, together with the valve mechanism for controlling the air, will now be described.

Referring to Figs. 3, 4, 5, 6 and 14 to 17 inclusive, air under pressure is supplied from any suitable source through a pipe 87$^a$ (Fig. 3) to a drum 37 forming part of the lower bearing of the blank mold carriage 32. The upper end of this drum is open, allowing air to pass to the passageways 89 formed in the mold carriage. A pipe 91 (Figs. 4, 6 and 17) leads from the drum 37 to a valve chest 92 mounted on an oscillating arm 93, this arm also carrying the air motor 77. Air under pressure is admitted to the motor 77 through pipes leading from the valve chest 92 in which are mounted valves 95.

Rigidly attached to the column 31 is a bearing bracket 220 (Fig. 6) having mounted thereon a shaft 221. Attached to the lower end of this shaft is a pinion 222 running in mesh with a ring gear 223, said ring gear attached to the mold carriage 32 and rotating therewith. Fastened to the upper end of shaft 221 is a pinion 224 running in mesh with a pinion 225, said pinion attached to one end of shaft 226. On the opposite end of this shaft is mounted a crank arm 227 carrying a roll 228, said roll running in a groove 229 formed in the blow head arm 93. Due to the rotation of ring gear 223 it will be seen that through the above mechanism, crank arm 227 will be rotated, thereby oscillating the arm 93 to and fro through a certain arc. The groove 229 is so shaped that the crank arm 227 will advance the arm 93 at the same angular speed as the mold carriage during the time the plate 75 is in its lowered position for closing the mold. Now, as the valve chest 92 and its actuating levers are carried by the arm 93, it will be noted that during the movement of the arm, the stationary cams 101, 102 and 103 will actuate the valves as follows: It will be supposed that blow head 75 is above and in register with a blank mold and just started on its clockwise movement. These valves are actuated by levers 96, 97 and 98 controlled respectively by stationary cams 101, 102 and 103 mounted on the column 31. The cam 103 will operate at 103$^a$ (Figs. 18, 19) through the lever 98 to open its valve and supply air through pipe 81 to the upper end of cylinder 77, thereby lowering the plate 75, holding said plate lowered until reaching cam section 103$^b$ where the valve is closed. The cam 102 operates at 102$^a$ through the lever 97, whereby its valve is opened and air is admitted through pipe 84, passages 104 and 105 (Fig. 15) in the piston and piston rod, then past the check valve 85 to the upper end of the mold 43 to compact the glass and insure a good neck finish. A section 102$^b$ is arranged to shut off the blowing air after a predetermined time interval. The cam 101 is arranged to actuate lever 96 to admit air through pipe 88 to raise the plate 75 immediately after section 103$^b$ closes off the air to the upper end of the cylinder. Springs 106 hold the valve levers in contact with their cams.

After the neck has been finished, the neck pin or plunger 107, which has been held in position in the the neck mold 44 by a stationary cam 108 (Figs. 1 and 4), is released and withdrawn. This neck pin is mounted in a holder 110, said holder mounted to reciprocate in the head 63 and normally held retracted by the spring 111. After the plunger is retracted and the air through plate 75 is discontinued, a blow arm 112 (Figs. 6 and 16) pivoted on the carriage 32 is swung about its fulcrum 113 by a cam section 114$^a$ of cam 114 contacting with a roller 115 on said arm. When the blow arm 112 swings from the Fig. 4 position to that shown in Figs. 6 and 16, air is admitted from chamber 89 (Figs. 4, 5 and 6) through pipe 117, passages 118 and 119 (Fig. 7), pipe 121 (see Fig. 16) to the blow arm, thence through passageways 122 and 123 in the neck pin holder and neck pin respectively to supply an initial blow to the blank. The raising and lowering of the blow arm controls the admittance of air to the blank mold for the initial blow. When arm 112 is in the Fig. 6 position, opening 121 of the arm is in communication with opening 119 in shaft 113, thereby allowing air to pass to the neck mold. When the arm is lowered, the air is automatically shut off. After the blank has been blown to hollow form, the blank mold opens, leaving the hollow blank projecting upward from and supported by the neck mold 44 on the head 63. This brings the operation up to the point shown in Figs. 10 and 14.

Attached to the shaft 67 of the inverting arm 64 (see Fig. 10) is a bevel gear 125 running in mesh with a gear 126 on a shaft 127 of the bearing block 68. The gear 126 has a projecting sleeve 128 on which is mounted a pinion 129. Running in mesh with this pinion is a rack 131 (see Figs. 8 and 4) mounted for horizontal reciprocation in a standard 132. Attached to one end of the rack is a cam roll 133 controlled by a stationary cam 134, said cam shaped to operate to invert and reinvert the neck mold carrying head 63 at predetermined intervals. Projecting lugs 135 and 136 (Fig. 14) of the arm 64 limit its movement in either direction by contacting with a pin 137 projecting from the bearing block 68.

When the operations have progressed to the point indicated in Fig. 9, a section 134$^a$ (Fig. 8) of the cam 134 operates to move the rack 131 radially outward, thereby operating through the connections above described to invert the head 63 from the full line position, (Fig. 14), to the dotted line position, bringing the parison to a position pendent from the neck mold and in register with a mold bottom plate 140 on the finishing mold carriage 34 at the point where radius line "A" (Fig. 9) crossses the arc of the finishing mold. The cam 134 is shaped at 134$^b$ to allow freedom of movement of the cam roll 133 in order that there may be no turning or inverting movement of the arm 64 during its horizontal movement, while traveling in alignment with the finishing mold from radius line "A" to line "B" (Fig. 9). When the inverting arm 64 reaches the position shown in Fig. 8, the cam roll 133 is just entering the section 134$^c$ of the cam 134, this section being so shaped that the head 63 is quickly swung up to the position shown in Fig. 5, so that during the continued travel of the tables there may be no interference between the neck molds 44 and the neck of the bottle which is projecting from the finishing mold. The section 134$^c$ blends into section 134$^d$ which is shaped to complete the inverting movement of the arm 64 during the further travel of the mold carriage 32.

Each complete finishing mold unit comprises a sectional finishing mold 141 and a bottom forming plate 140. The mold comprises separable mold sections mounted in arms 142 pivoted to swing about a bearing sleeve 143. Links 144 connect the mold arms with a yoke 145 on a slide 146 which reciprocates in guides 147 on the carriage 34. The yoke 145 is connected through a link 148 to a rock arm 150 on a rock shaft 151 to which is also connected a rock arm 152 having a cam roll 153 running in a stationary cam 154. This cam is so shaped as to effect the opening and closing of the mold at intervals, as hereinafter noted. As the mold carriage 34 rotates, each mold 141 is brought to a position at the radial line "A" (Fig. 9) where the parison is received into the finishing mold. The further rotation of the finishing mold table causes the molds to close about the parison so that it may be entirely enclosed upon reaching the radius line "D". Section 154ª (Fig. 2) of the cam 154 is shaped to have the molds 141 just about closed upon reaching radius line "A".

Mounted upon and extending upward from the mold carriage 34 are vertical uprights 155 (Figs. 1, 2 and 21). A ring gear 156 having lug extensions 157 is arranged upon these uprights for travel with the carriage. Mounted upon the column 33 is a bearing casting 160 (Fig. 21) having formed at its outer end a bearing 161 and in which is freely mounted a shaft 162. Attached to the lower end of this shaft is a pinion 163, said pinion running in mesh with the ring gear 156. Attached to the upper end of the shaft 162 is a cam 164 in which runs a cam roll 165, said roll mounted on a blow head carrying arm 166. This blow head arm is mounted for oscillation on the column 33 and carries a pair of blow head cylinders 167 and 168 and a neck mold opening cylinder 169 (Fig. 20).

Referring to Figs. 20, 21 and 24, it will readily be seen that the rotation of the carriage 34 will transmit motion from the gear ring 156 to pinion 163, which in turn rotates the cam 164, thereby oscillating the blow head arm 166 from the full line position (Fig. 24), to the dotted line position. The cam 164 is shaped, as clearly illustrated in Fig. 24, so that as it rotates, the arm 166 will be reciprocated to and fro through a short arc in timed relation to the molds. The oscillation of this arm allows the blow head cylinders 167 and 168 to register with two adjacent finishing molds at a certain point and travel therewith a predetermined distance in order that the parisons in said molds may be blown to their finished form. The blow head cylinder 167 meets a mold at the line "D" (Fig. 9) and travels therewith to the line "B", during which time air under pressure is admitted through the blow head to shape the glass in the mold.

Referring to Figs. 3 and 20 to 24 inclusive, air under pressure is supplied through a pipe 87ᵇ to the drum 38, said drum being open at its upper end to allow air to pass into the passageways 171 formed in the finishing mold carriage 34. Air from this drum passes through pipe 172 (Figs. 3 and 20) to pipes 190, 192 and 203. A branch 176 leads to a valve casing 177 (Figs. 24 and 22) mounted on the stationary bearing casting 160. Mounted on the shaft 162 are two cams 178 and 179 for actuating valves 181 and 182 respectively. When the blow head cylinder 167 is brought into alignment with the mold at line "D", a section 179ª (Fig. 23) of the cam 179 actuates valve 182, admitting air from pipe 176 to passage 183 of the valve casing and to passage 184 of the valve 182, thence through pipe 185 and to the upper end of the cylinder 167 to lower the piston 186 thereof. A blow head 187 mounted on the piston rod 188 is thereby brought into engagement with the plunger holder 110 (Fig. 3). Pipe 190 leading to the blow head has a constant air pressure so that when the blow head engages the neck pin holder, the piston rod continues to move downward until opening 191 in said rod is brought into alignment with the pipe 190 allowing air to pass from the blow head through passages 122 and 123 (Fig. 16) in the holder and neck pin to blow the bottle. This blowing continues until the blowing head reaches line "B" (Fig. 9), at which time section 179ᵇ (Fig. 23) of the cam allows the valve 182 to close. Due to the fact that a constant air pressure is maintained in pipe 192 leading to the bottom of the cylinder 167, it will be noted that when the valve 182 closes, the piston 186 will immediately move up, withdrawing the blow head.

Slightly before the blow head is raised, the section 178ª of cam 178 (Fig. 23) actuates valve 181, admitting air through pipe 193 to the upper end of the cylinder 169 (Fig. 20), thereby lowering its piston 194. Attached to the piston rod 195 is a cam plate 196 which when lowered contacts with a stem 197 (Figs. 6, 8 and 16) mounted in the neck mold head 63. This stem is normally held projected by a spring 198, but when the cam plate is lowered the stem is pushed down and its conical end 200 contacts with pads 201 (Figs. 12 and 13) on the neck mold arms, opening the molds. The neck molds are normally held closed by a spring clip 202. Immediately after the neck molds are opened, the section 74ᶜ of cam 74 operates through connections hereinbefore described to swing the neck molds 44 from position in alignment with the finishing molds 141 at line "B" to point "C" (Fig. 9), in order to allow the neck molds to clear the neck of the bottle which is projecting from the mold (Fig. 5). The cam plate 196 is so shaped that it holds the neck molds open until they have entirely cleared. When the neck molds have reached point "C" (Fig. 9) the cam 178 allows the valve 181 to return to normal position (Fig. 22), thereby shutting off air to the upper end of cylinder 169. Pipe 203 is a branch of pipe 172 and, therefore, carries a constant air pressure so that the moment valve 181 closes, the piston 194 will move upward, withdrawing plate 196 and allowing the neck molds to close. At about the same time, the section 134ᶜ of cam 134 moves cam roll 133 inward and through the mechanism heretofore explained swings head 63 abruptly upward about its fulcrum 67 to the position shown in Fig. 5. From this point on the cam section 134ᵈ acts, due to the carriage movement, to slowly revert the head 63 back to normal position (as shown in Figs. 4 and 6) and cam section 74ᶜ of cam 74 acts to bring the neck molds 44 into alignment with the blank molds 43 and hold them in such position during the formation of another blank or parison.

When the blow head 167 leaves the finishing mold at point "B", the blank has been blown to the shape of the finishing mold, but due to the fact that the glass is still quite hot it is very possible that this shape will not be retained. Therefore, another blow head 187ᵃ (Fig. 21) has been provided, operated by a piston motor including the cylinder 168, (see also Fig. 24), to supply a further blow or setting of the glass. This blow head is of the same construction as blow head 187 and operates in synchronism therewith. A branch pipe 204 leads from pipe 185 for lowering the blow head, while pipe 205 connected to a constant supply pipe 172 operates to move the blow head back to its normal position. Pipe 210 supplies blowing air to the second blow head. Air for cooling the blank molds is conducted from the drum 37 through channels 89 formed in the carriage 32 to the interior of the bearing sleeves 46 which, as shown in Fig. 6, have ports opening into the hollow arms 45 which carry the mold sections. The air channels in the arms 45 terminate in openings 206 (Fig. 6). The cooling means for the finishing molds is similar to that of the blank molds. The air passes from channels 171 (Fig. 3) in the carriage 34 to bearing sleeves 143, thence through arms 142 to the molds. Ports 207 opening from the channels 171 communicate with nozzles 208 by which blasts of air are directed against the finishing mold bottoms 140.

The finishing mold bottom comprises an annular section 209 in which is freely mounted a bottom forming plate 140. The mold bottom is carried by a bracket 211 pivoted at 212 to permit the mold bottom to tilt and discharge the bottle after the finishing mold has opened. The mold bottom is returned to upright position by a stationary cam 213 on which runs a roll 214 on the bracket 211. The cam 213 is shaped at 215 (Fig. 2) so as to allow the mold bottom to tilt and discharge the articles. A section 154ᵇ (Fig. 2) opens the finishing molds, and section 154ᶜ holds them open while the discharge is being accomplished.

Modifications may be resorted to within the spirit and scope of my invention.

What I claim is:

1. In a machine for forming hollow glass articles, the combination of a rotating mold carriage, a series of finishing molds thereon, a blowing head, means to oscillate said head and thereby cause it to register with each of said molds in succession, travel with the mold a predetermined distance and then return and register with the next succeeding mold, blank molds, means for forming parisons of glass in the blank molds, means for transferring the parisons and introducing them into the finishing molds, and means for supplying air under pressure through said blowing head and thereby blowing the parisons to finished form in the finishing molds.

2. In a machine for forming hollow glass articles, the combination of a mold carriage, means to rotate it, a series of finishing molds mounted to rotate with said carriage, means for forming parisons of glass and introducing them in succession into said molds, blowing heads, means for causing each blowing head to register with said molds in succession, means for supplying air under pressure through said blowing heads while in register with the molds, and means for causing each blowing head to travel a predetermined distance with each mold while in register therewith and then return for registry with a succeeding mold.

3. In a machine for forming hollow glass articles, the combination of a mold carriage rotatable about a vertical axis, a series of finishing molds mounted on the carriage to rotate therewith, a frame mounted to oscillate about the axis of the mold carriage, blowing heads thereon, means for causing said heads to concurrently register with adjacent finishing molds and advance therewith through a predetermined distance and then return and register with succeeding molds, automatic means for forming parisons and introducing them into said molds, and means for supplying air through the blowing heads.

Signed at Toledo, Ohio, this 9th day of February, 1929.

LEONARD D. SOUBIER.